United States Patent [19]
Podhrasky et al.

[11] Patent Number: 5,138,262
[45] Date of Patent: Aug. 11, 1992

[54] METAL DETECTOR HAVING DETACHABLE BATTERY AND SPEAKER HOUSING

[75] Inventors: Robert J. Podhrasky, Dallas; Gerald L. Johnson, Garland, both of Tex.

[73] Assignee: Garrett Electronics, Inc., Garland, Tex.

[21] Appl. No.: 540,851

[22] Filed: Jun. 20, 1990

[51] Int. Cl.⁵ .............................................. G01V 3/11
[52] U.S. Cl. .................................................... 324/327
[58] Field of Search ................................. 324/326–329

[56] References Cited

U.S. PATENT DOCUMENTS

| | | | |
|---|---|---|---|
| 2,326,659 | 5/1945 | Chireix | 324/327 |
| 4,540,943 | 9/1985 | Akers | 324/327 |

Primary Examiner—Walter E. Snow
Attorney, Agent, or Firm—Richard, Medlock & Andrews

[57] ABSTRACT

A hobby-style metal detector includes a two-piece stem interconnected by a hand grip and provided with an arm rest. A search coil is positioned at the lower end of the first section of the stem and an electronic housing is mounted on the first stem section near the hand grip. A metal detector circuit, a display and operator controls are provided with the electronic housing. A second housing is detachably connected to the second section of the stem in conjunction with the arm rest. The second housing contains batteries and can be detached and clipped to the operator's belt to reduce the weight carried by the operator's arm. A speaker can further be included within the second housing thereby removing additional weight from the arm carried unit. A cable is provided to extend from the second housing to the electronic package for providing the battery power to the metal detector circuit. When a speaker is provided in the second housing, a further line is provided in the cable for the detection signal. The cable is preferably a coiled cable which is inserted within a second section of the stem when the second housing is mounted on the metal detector.

24 Claims, 3 Drawing Sheets

METAL DETECTOR HAVING DETACHABLE BATTERY AND SPEAKER HOUSING

TECHNICAL FIELD OF THE INVENTION

The present invention pertains in general to metal detectors and in particular to a metal detector which has a battery package housing.

BACKGROUND OF THE INVENTION

Metal detectors, particularly for hobby use, have been produced in many sizes and configurations. A typical configuration is a arm-held unit which has a metal stem, a search coil at the lower end and an electronics package mounted on the stem. The detectors can have handles of various types. In such a configuration, the detection circuitry, display and batteries are contained within a single housing which can be viewed by the operator. In many cases, the operator can also utilize a headset which is connected to the electronic package. In using a metal detector of this type over an extended period of time, the operator can experience fatigue due to the weight of the unit. One approach to reducing this fatigue is to make the electronic package removable from the metal detector stem and search coil. This eliminates the weight on the user's arm. An electronic module can be mounted by a clip to the user's belt so that that portion of the weight is not on the user's arm. However, this requires that there be a cable from the search coil to the electronic module. This is often bulky and obtrusive. Further, if the display is connected to the electronics, it is awkward for the operator to view the display.

Improved versions of arm and hand-held detectors have been developed which include a hand grip at the center of the stem and an arm rest. This equalizes the load of the detector and makes the operation of swinging it back and forth over the ground easier. However, there still remains a continuing problem associated with the weight of the electronics package and in particular the batteries which are included within the package.

To improve the usability of operator carried metal detectors, there is a need for an improved design which removes weight from the operator's arm but does not hamper the use of the detector instrument itself.

SUMMARY OF THE INVENTION

A selected embodiment of the present invention is a metal detector which includes a stem, a search coil mounted at one end of the stem, a metal detector circuit which is mounted within a first housing and is connected to the search coil for producing a detection signal when the search coil is positioned in the vicinity of a target object. The first housing is mounted on the stem. A battery or batteries are provided and are mounted within a second housing that is detachably connected to the detector. A cable is provided which extends from the second housing to the metal detector circuit for providing power from the battery to the metal detector circuit.

In a further aspect of the present invention, a speaker is also included in the battery housing and there is further included a line in the cable for providing the detection signal from the metal detector circuit to the speaker.

BRIEF DESCRIPTION OF THE DRAWINGS

For a more complete understanding of the present invention and the advantages thereof, reference is now made to the following description taken in conjunction with the accompanying drawings in which.

DETAILED DESCRIPTION

The present invention is a metal detector of the hobby type which is used for the location of coins, relics and the like. It is used as well by professionals in locating gold and silver nuggets. Such detectors are further used by police officers for locating metallic evidence.

The electronic circuitry of the present invention can be that used and described for existing metal detectors. Such a circuit is shown in Podhrasky U.S. Pat. No. 4,700,139, filed Oct. 29, 1984 and entitled "Metal Detector Circuit Having Selectable Exclusion Range for Unwanted Objects." U.S. Pat. No. 4,700,139 is herein incorporated by reference.

Figure 1:
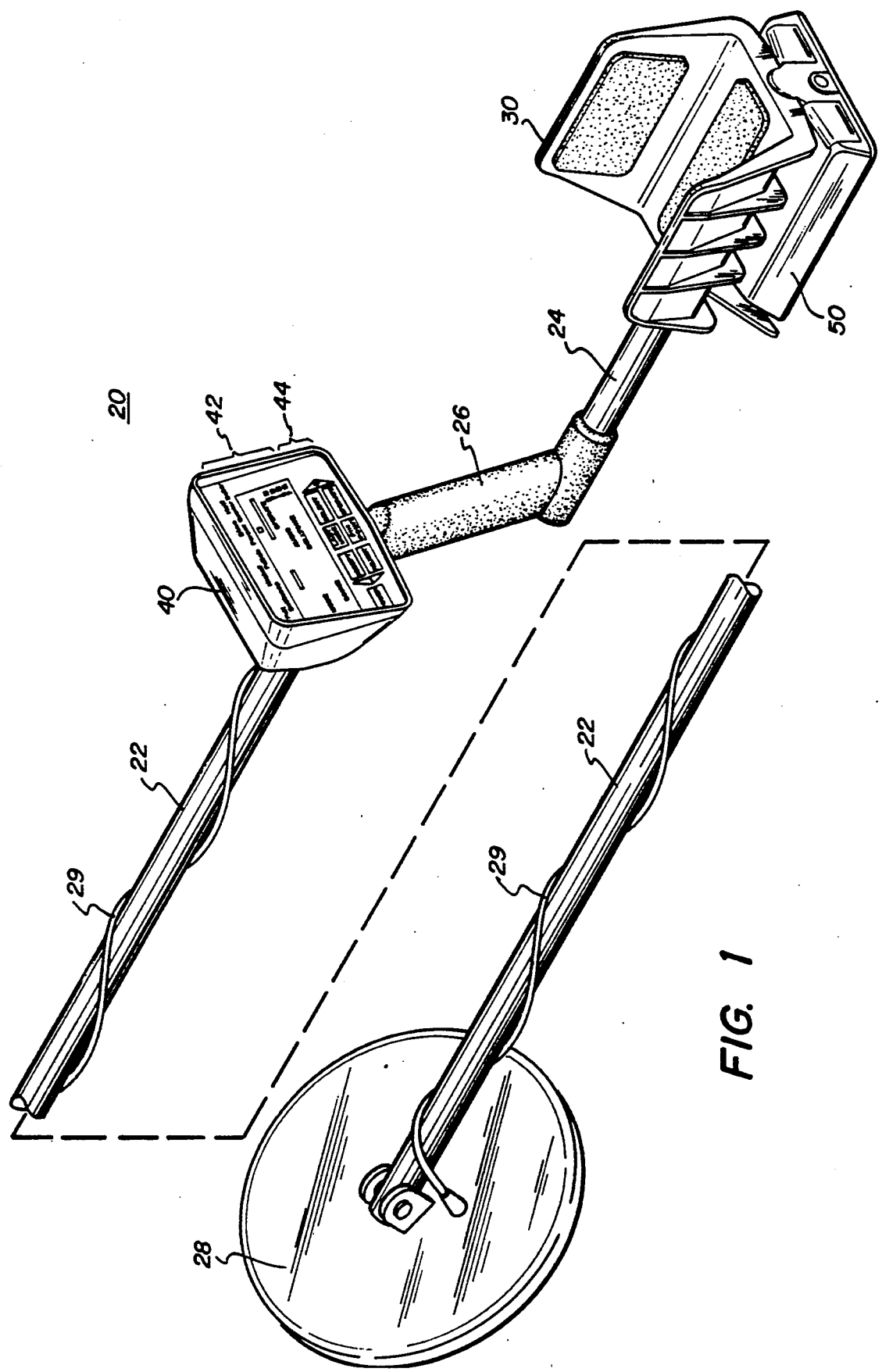
FIG. 1 is a perspective view of an arm-held metal detector in accordance with the present invention, wherein a battery housing is connected to the metal detector.

Referring to FIG. 1, there is shown a metal detector 20 in accordance with the present invention. This metal detector includes a stem that has a first section 22 and a second section 24 which are positioned parallel to but noncoaxially with each other and which are interconnected by a hand grip 26. A search coil 28 is mounted at the free (lower) end of the stem section 22. An arm rest 30 is mounted on the free end of the second stem section 24.

A first housing 40 is connected to the upper end of the stem section 22 adjacent to the grip 26. Within the first housing 40, there is provided a metal detector circuit, as noted in the incorporated patent U.S. Pat. No. 4,700,139, a display 42 and operator controls for the metal detector circuit, e.g. a touchpad 44 for receiving commands from an operator.

The operator controls are connected to the metal detector circuit to transmit thereto the operator's commands, while the display 42 receives a detection signal from the metal detection circuit.

The metal detector 20 further includes a second housing 50 which is mounted on a slidable connector which is incorporated into the arm rest 30. Within the housing 50 there are provided battery packs and a speaker for use with the electronics within the housing 40. This is further described in reference to FIG. 3.

Figure 2:
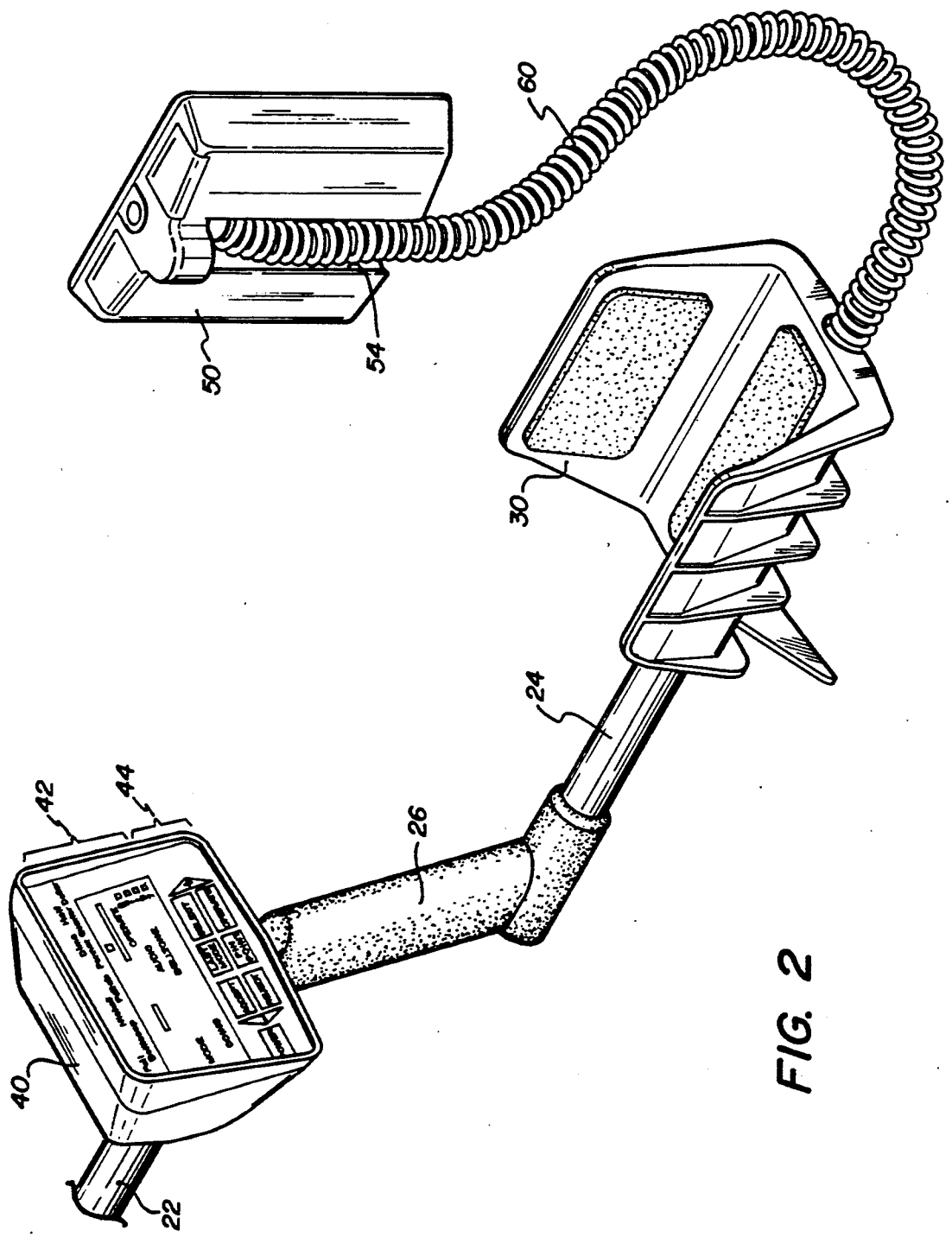
FIG. 2 is a perspective view of the metal detector of the present invention wherein the battery housing has been detached from the metal detector and can be attached via a clip to the belt of the operator.

The housing 50 is mounted to the arm rest 30 by means of a groove and lip assembly. A lip 54 is shown on the housing 50 in FIG. 2. The housing 50 is held in position when mounted on the detector 20 by either a snap or friction fit. Referring to FIG. 2, there is shown a coiled cable 6 which electrically connects the components within the housing 50 to the electronics within the housing 40. The cable 60 includes electrical lines for providing DC power from the batteries in the housing 50 to the electronics in the housing 40. Cable 60 further includes lines for transferring a detection signal from the electronics within the housing 40 to a speaker mounted within the housing 50. When the housing 50 is mounted to the detector 20, the cable 60 is inserted into the stem section 24 for storage.

Figure 3:
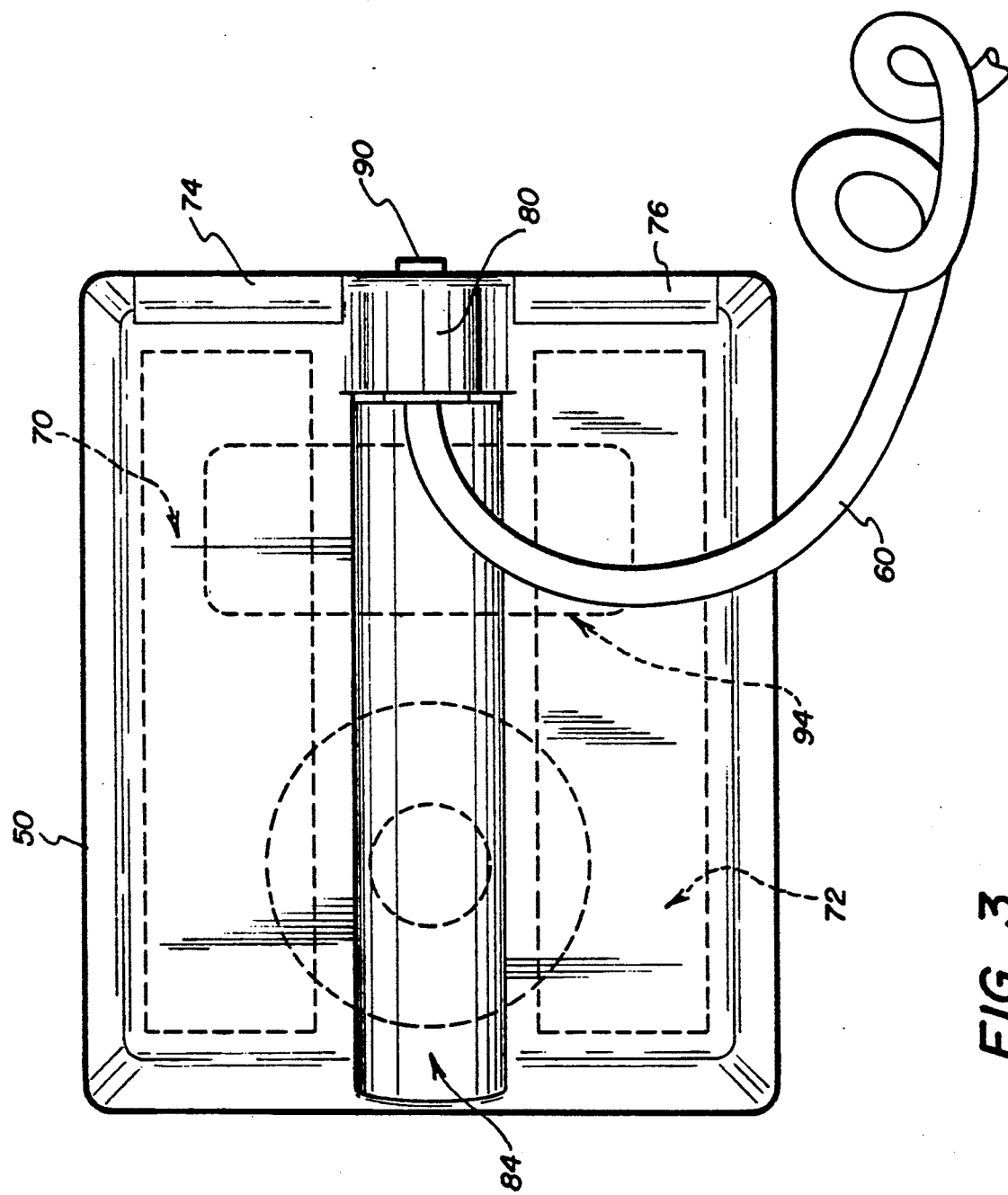
FIG. 3 is an illustration of the housing 50 which includes a battery package and a speaker.

Referring now to FIG. 3, there are shown additional details of the housing 50. Included within the housing 50 are battery packs 70 and 72 which are installed and removed through respective battery access covers 74 and 76. A power/audio connector 80, a telephone style jack, is connected to the cable 60. Further connections (not shown) are included to connect lines within the cable 80 to the battery packs 70 and 72 as well as to a speaker 84 which is mounted within the housing 50 and shown in phantom lines.

The housing 50 further includes a headphone jack 90 which is connected to the cable 60. A belt clip 94 is connected to the housing 50.

In summary, the present invention is a metal detector instrument which includes, among other features, a removable housing which includes battery packs and a speaker which can be clip mounted to the user's belt when disconnected from the metal detector instrument.

Although one embodiment of the invention has been illustrated in the accompanying drawings and described in the foregoing detailed description, it will be understood that the invention is not limited to the embodiment disclosed, but is capable of numerous rearrangements, modifications and substitutions of parts and elements without departing from the scope of the invention.

What we claim is:

1. A metal detector, comprising:
 a stem having a first end and a second end,
 a first housing mounted on said stem intermediate the first and second ends of said stem,
 a search coil mounted at said first end of said stem,
 a metal detector circuit mounted within said first housing and connected to said search coil for producing a detection signal when said search coil is positioned in the vicinity of a target object,
 a second housing which is detachably connected to said stem adjacent said second end thereof so that when connected, the second housing is securely attached with respect to said stem,
 a battery mounted within said second housing, and
 a cable extending from said battery in said second housing to said metal detector circuit and having electrical lines for providing power from said battery to said metal detector circuit.

2. A metal detector as recited in claim 1 including a control element manually actuatable by an operator, said control element being mounted at said first housing and connected to said metal detector circuit.

3. A metal detector as recited in claim 2 including a display mounted at said first housing so as to be viewed by the operator, said display being connected to receive a detection signal from said metal detection circuit.

4. A metal detector as recited in claim 3 further including a speaker mounted at said second housing, and wherein said cable includes electrical lines for providing a detection signal from said metal detector circuit to said speaker.

5. A metal detector as recited in claim 4 including an arm rest mounted on said stem adjacent said second end of said stem, said stem having a hand grip positioned intermediate said arm rest and said first end of said stem, at least one of said arm rest and said second housing having at least one mounting element whereby said second housing can be detachably connected to said arm rest.

6. A metal detector as recited in claim 5 wherein said second housing includes a belt clip, whereby said second housing can be disconnected from said arm rest and attached to the belt of the operator.

7. A metal detector as recited in claim 6 wherein at least the portion of said stem adjacent the second end of said stem is hollow such that said cable can be stored in said stem when said second housing is connected to said arm rest.

8. A metal detector as recited in claim 7 wherein said cable is a coiled cable.

9. A metal detector as recited in claim 8 wherein said stem comprises first and second sections which are positioned noncoaxially and which are interconnected by said hand grip, said first section having a first end and a second end, with said search coil being connected to the first end of said first section of said stem and said hand grip being connected to the second end of said first section of said stem, and wherein said first housing is positioned adjacent the connection of said hand grip to said second end of said first section of said stem.

10. A metal detector as recited in claim 9 wherein said at least one mounting element for detachable connecting said second housing to said arm rest comprises a slidable connector.

11. A metal detector as recited in claim 9 wherein said at least one mounting element for detachably connecting sad second housing to said arm rest comprises a groove and lip assembly.

12. A metal detector as recited in claim 1 including a display mounted at said first housing so as to be viewed by the operator, said display being connected to receive a detection signal from said metal detector circuit.

13. A metal detector as recited in claim 1 further including a speaker mounted at said second housing, wherein said cable includes electrical lines for providing a detection signal from said metal detector circuit to said speaker.

14. A metal detector as recited in claim 1 including an arm rest mounted on said stem adjacent said second end of said stem, said stem having a hand grip positioned intermediate said arm rest and said first end of said stem, at least one of said arm rest and said second housing having at least one mounting element whereby said second housing can be detachably connected to said arm rest.

15. A metal detector as recited in claim 14 wherein said stem comprises first and second sections which are positioned noncoaxially and which are interconnected by said hand grip, said first section having a first end and a second end with said search coil being connected to the first end of said first section of said stem and said hand grip being connected to the second end of said first section of said stem, and wherein said first housing is positioned adjacent the connection of said hand grip to said second end of said first section of said stem.

16. A metal detector as recited in claim 15 wherein said at least one mounting element for detachably connecting said second housing to said arm rest comprises a slidable connector.

17. A metal detector as recited in claim 16 wherein at least a portion of said second section of said stem is hollow such that said cable can be stored in said second section of said stem when said second housing is connected to said arm rest.

18. A metal detector as recited in claim 17 wherein said cable is a coiled cable.

19. A metal detector as recited in claim 14 including a display mounted at said first housing so as to be viewed by the operator, said display being connected to receive a detection signal from said metal detector circuit.

20. A metal detector as recited in claim 19 further including a speaker mounted at said second housing, and wherein said cable includes electrical lines for providing a detection signal from said metal detector circuit to said speaker.

21. A metal detector, comprising:
   a tubular stem having a search coil mounted thereto,
   a metal detector circuit mounted to said stem, said metal detector circuit being electrically connected to said search coil,
   an armrest mounted to the tubular stem, said armrest having a receptacle,
   a battery housing having a mounting adapted for secure attachment to said armrest receptacle and detachment therefrom, and
   a coiled electrical cable attached to said battery housing and routed through said tubular stem to said metal detection circuit, said coiled cable being storable in said receptacle when said battery housing is attached to said armrest receptacle.

22. The metal detector as recited in claim 21 wherein said armrest receptacle and said battery housing are slidably attached together by a groove and lip assembly.

23. The metal detector as recited in claim 21 wherein said armrest receptacle and said battery housing are snap locked together when attached.

24. The metal detector as recited in claim 21 wherein said armrest receptacle and said battery housing are secured together by a friction fit when attached.

* * * * *

UNITED STATES PATENT AND TRADEMARK OFFICE
CERTIFICATE OF CORRECTION

PATENT NO. : 5,138,262
DATED : August 11, 1992
INVENTOR(S) : Podhrasky et al.

It is certified that error appears in the above-identified patent and that said Letters Patent is hereby corrected as shown below:

Col. 2, line 62, please delete the numeral "6" and substitute therefor the numeral -- 60 --.

Col. 3, line 57, please delete the delete the second occurrence of the word "detection" and substitute therefor the word -- detector --.

Col. 4, line 25, please delete the word "detachable" and substitute therefor the word -- detachably --.

Col. 4, line 30, please delete the word "sad" and substitute therefor the word -- said --.

Col. 6, line 8, please delete the word "detection" and substitute therefor the word -- detector --.

Signed and Sealed this

Fourteenth Day of September, 1993

Attest:

BRUCE LEHMAN

Attesting Officer  Commissioner of Patents and Trademarks